(12) United States Patent
Edelson et al.

(10) Patent No.: US 6,348,775 B1
(45) Date of Patent: Feb. 19, 2002

(54) DRIVE WAVE FORM SYNCHRONIZATION FOR INDUCTION MOTORS

(75) Inventors: Jonathan Sidney Edelson, North Plains, OR (US); Brian Von Herzen, Carson City, NV (US)

(73) Assignee: Borealis Technical Limited, Gibraltar (*) Notice: Subject to any disclaimer, the term of this patent is extended or adjusted under 35 U.S.C. 154(b) by 0 days.

(21) Appl. No.: 09/570,166

(22) Filed: May 11, 2000

Related U.S. Application Data (60) Provisional application No. 60/133,547, filed on May 11, 1999.

(51) Int. Cl.$^7$ .................................................. H02P 1/24
(52) U.S. Cl. ..................... 318/727; 318/811; 318/805; 318/599; 318/807; 318/810; 318/806
(58) Field of Search ................................. 318/811, 805, 318/599, 807, 810, 806, 727; 388/811

(56) References Cited

U.S. PATENT DOCUMENTS

| | | | | |
|---|---|---|---|---|
| 5,329,217 A | * | 7/1994 | Kerkman et al. | 318/811 |
| 5,422,570 A | * | 6/1995 | Moreira | 318/434 |
| 5,467,262 A | * | 11/1995 | Nakata et al. | 318/811 |

* cited by examiner

*Primary Examiner*—Karen Masih

(57) ABSTRACT

A polyphase induction motor is operated by an inverter drive system comprising a logic level controller. A number, preferably twelve or more, of independently driven phases causes harmonic fields, up to a number equal to the number of phases, to oscillate in synchrony with the fundamental oscillating field. A pulse-width modulation ("PWM") carrier is used by the logic level controller to synthesize a desired drive alternating current, in which the pulsing distortion produced by the pulse width modulation produces a synchronous oscillating field in the driven polyphase induction motor.

27 Claims, 7 Drawing Sheets

DRIVE WAVE FORM SYNCHRONIZATION FOR INDUCTION MOTORS

CROSS REFERENCE TO RELATED APPLICATIONS

This application claims priority from, and incorporates by reference, in its entirety, U.S. Provisional Application Ser. No. 60/133,547 filed on May. 11, 1999. The present application also is related to U.S. Pat. No. 6,054,837, titled "Polyphase Induction Electrical Rotating Machine," issued Apr. 25, 2000, which is a Continuation-in-Part of pending U.S. patent application Ser. No. 08/350,357, titled "Method of Operating electrical Rotating Machinery via Independent Synthesis to Each Stator Conductor," filed on Dec. 7, 1994, which is further a Continuation-in-Part of U.S. patent aplication Ser. No. 08/267,043, titled "Method of Operating an AC Induction Motor via Independent Synthesis of AC Current to Each Stator Winding," filed on Jun. 28, 1994, all of which are herein incorporated by reference in their entirety.

BACKGROUND OF THE INVENTION

1. Field of the Invention

This invention relates generally to polyphase induction electrical machinery systems and more specifically, to a device and method for synthesizing a desired output alternating current ("AC") necessary to operate a polyphase AC induction motor.

2. Description of Related Art

A polyphase AC induction motor is operated by an inverter drive system, as disclosed in U.S. Pat. No. 6,054,837 by the current inventor, and herein incorporated by reference in its entirety. The improvement over the prior art is that the number of independently driven phases is increased to more than the conventional three, preferably to a number substantially greater than three, such as twelve or more phases. The stator is wound with little or no chording, and with little or no winding distribution, both allowing windings with fewer turns to be used. Thus, resistance losses in the stator windings are reduced. Large machines with low pole counts are facilitated by the reduced winding distribution, again enhancing efficiency because low pole count machines are more efficient. Motor control configuration may be changed electronically to control the stator magnetic field structure.

The use of many phases reduces substantially the problems associated with harmonic oscillating fields. Specifically, the use of many phases causes harmonic fields, up to a number equal to the number of phases, to move in synchrony with the fundamental oscillating field. Both spatial and temporal harmonic fields are still developed, but such fields add beneficially to the fundamental oscillating field of the machine. Harmonics of higher order than the number of phases still excite non-synchronous oscillating fields; however, such high order harmonics are, in general, very weak. Therefore, motor efficiency losses associated with harmonic fields are reduced.

There are several sources of both spatial and temporal harmonics, including motor saturation effects and aspects of inverter design. A particular source of non-synchronous oscillating fields is a pulse-width modulation ("PWM") carrier used by the inverter. The PWM carrier is the basic pulsing waveform produced by the inverter switching elements. The PWM carrier is modulated by changing the relationship between positive and negative pulses in order to produce the desired output waveform. In general, the higher the frequency of the PWM carrier, the greater the fidelity of the desired output waveform. However, this increase in fidelity comes at a price, including increased electromagnetic interference, increased switching element noise, and increased system cost. While not necessarily a harmonic of the desired output waveform, in that the frequency of the PWM carrier need not be a multiple of the frequency of the desired output waveform, the PWM carrier is capable of producing a non-synchronous field. Thus, there is a need to either reduce the intensity, or obtain benefit from, the oscillating field produced by the PWM carrier.

SUMMARY OF THE INVENTION

From the foregoing, it may be appreciated that there is a need for a method and device for synthesizing a desired output alternating current using pulse width modulation, in which the pulsing distortion produced by the pulse width modulation does not degrade the efficiency of the motor. In one embodiment of the present invention, this pulsing distortion is constrained by the selection of proper pulse width modulation techniques to produce a rotating magnetic field in the motor that is synchronous with the desired rotating magnetic field. A n phase order inverter drives a n phase order induction motor. The pulse width modulation is selected so as to produce a fixed number M of PWM pulses per output cycle, with M constrained to be less than n.

The pulse width modulation may be produced by well known techniques, for example through the use of half bridge or full bridge switching elements, driven by a logic controller.

OBJECTS AND ADVANTAGES

It is an object of the present invention to produce a PWM oscillating field that is synchronous with the fundamental.

A technical advantage of the present invention is an increased efficiency.

Another technical advantage is an increased motor output power due to the increased efficiency Another technical advantage is a decreased PWM switching frequency.

Another technical advantage is greater inverter efficiency due to the decreased PWM switching frequency.

Other technical advantages of the present invention are set forth in or will be apparent from drawings and the description of the invention that follows, or may be learned from the practice of the invention.

DESCRIPTION OF THE DRAWINGS

For a more complete explanation of the present invention a nd the technical advantages thereof, reference is now made to the following description and the accompanying drawings, wherein.

DETAILED DESCRIPTION OF THE INVENTION

Embodiments of the present invention and their technical advantages may be better understood by referring to FIGS. 1–7.

According to one embodiment of the invention, a drive system or controller synthesizes an 18 phase alternating current to operate a high phase order induction motor. In general, the design of the controller should not be wedded to the 18 phase number and can be any number greater than three, as different phase counts are used to get different output power levels using the same inverter electronics. Motor windings are star connected, and the driven sides are connected to 'half-bridge' or 'totem pole' circuit elements.

In an embodiment of the p resent invention, the drive system, or controller, comprises electronics for synthesizing an alternating current having n phases to operate a n phase order induction machine, where n is greater than 3. The synthesized alternating current is derived using a pulse width modulation technique having periods selected such that a pulsing distortion of an output waveform produces an oscillating field that is synchronous with a desired field and is used to drive each phase displaced in time by a phase angle that is equal to a physical angle of a winding stator. A logic level controller is used to provide pulse width modulation signals to the electronics.

In another embodiment of the present invention a pulse width modulation technique to generate a synchronized drive waveform for a n phase order induction machine, where n>3, comprises the steps of: supplying electrical power from a DC power supply to n half bridges, wherein each of half bridge circuits comprises of a positive switching element connected to a positive rail of the DC power supply and a negative switching element connected to the negative rail of the DC power supply. Operation of the switching elements occurs via a control input signal which is a periodic waveform generated by a pulse width modulation technique. The resultant output drive waveform at each n half bridge, each displaced in time by a phase angle that is equal to the physical angle of a winding in a stator, drives each of the n phases of the induction machine. The pulse width modulation technique has a pulsing distortion that generates an oscillating field that is synchronous with a desired oscillating field.

Figure 1:
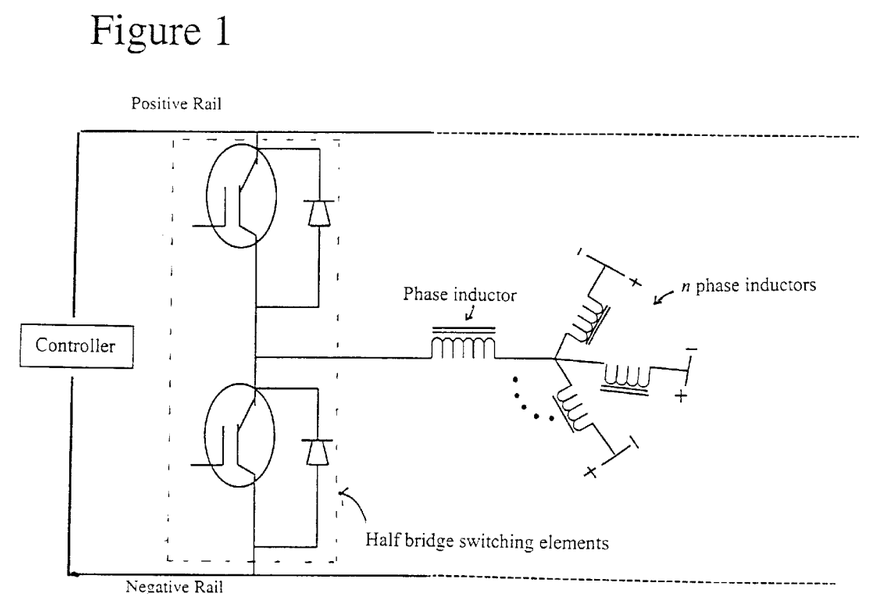
FIG. 1 depicts circuit elements according to an embodiment of the present invention.
Figure 2:
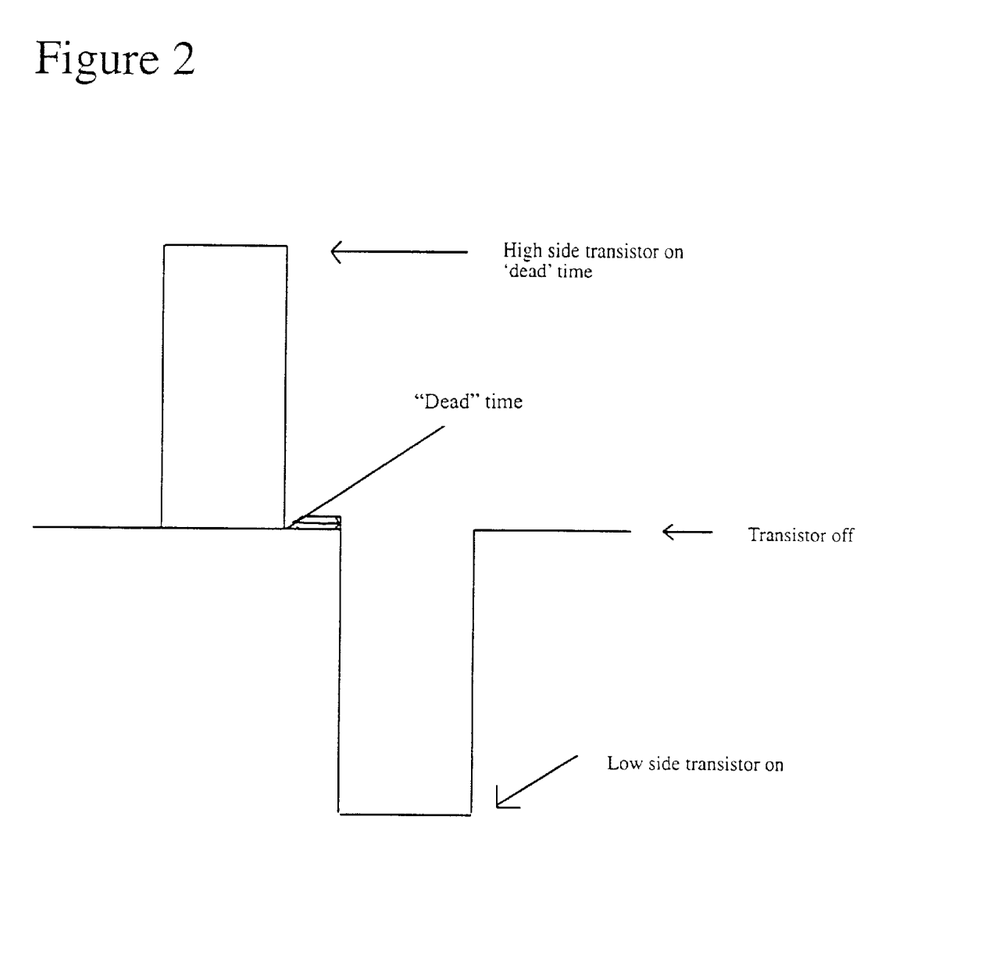
FIG. 2 represents a state of the invention, as depicted in FIG. 1, to describe the control of a single phase.

As the circuit depicted in FIG. 1 shows, each phase is driven by a half bridge consisting of two semiconductor switching elements. These two switching elements provide a conductive path from the DC rails of the half bridge power supply and the output of the half bridge to the phase. Since the two switching elements are operated in a binary fashion, and are never on at the same time, we may represent the state of the half bridge with the representation of FIG. 2, to describe the control of a single phase. When the graph is at the upper extreme, then the positive switching element is on, and when the graph is at the lower extreme then the negative switching element is on. When it is permissible to have both switching elements off, then this is represented by the graph at zero.

Each particular type of switching element has its own particular drive requirements. For example, n-channel IGBT devices, which are high power semiconductor switching elements, require that their gate terminal be brought to 15 volts relative to their source terminal in order to permit conduction between drain and source. Numerous devices are available to provide the necessary gate signals. These devices are capable of translating logic level control signals to the requisite switching element drive signals. Additionally, there are numerous switching elements that may be used, with their associated drive techniques. Accordingly, the present specification will focus on a generic logic driven power switching element, drawn as a transistor driven directly by a suitable logic signal. It will be obvious to an individual of ordinary skill in the art that this represents the entire package of switching element, logic to drive level shifting components, isolation components, etc.

In the present invention, the same periodic waveform drives each phase, displaced in time by a phase angle that is equal to the physical angle of the winding in the stator. The windings need not be equally distributed, and the drive phase angle for each winding needs to be matched appropriately to the physical position of that winding, for example, with a lookup table.

The desired output voltage is synthesized using pulse width modulation, and there are several PWM techniques that may be implemented in the present invention. In the present invention, the pulsing distortion of the desired output waveform is considered part of the waveform that must have appropriate phase matching amongst the phases. Thus, the pulsing distortion caused by PWM synthesis will generate an oscillating field that is synchronous with the field produced by the synthesized drive waveform.

Figure 3:
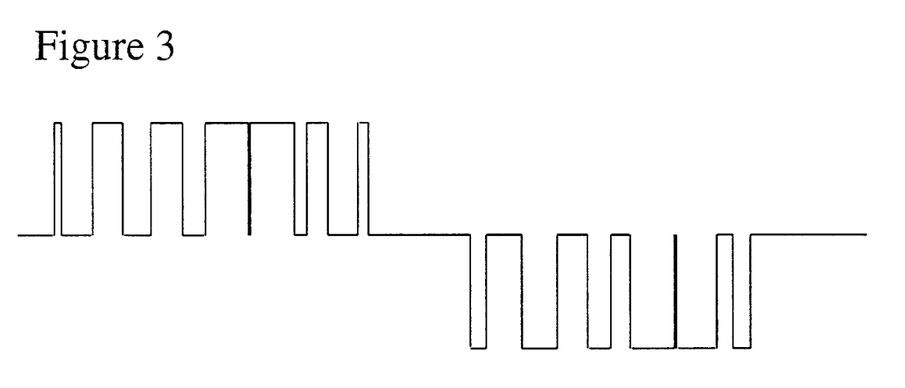
FIG. 3 shows a PWM modulation scheme that does not produce a synchronous oscillating field in a driven polyphase AC induction motor.

FIG. 3 shows a flawed PWM approach to generate the output for a single phase. In this case, the positive switching element is modulated between on and off over the positive half of the desired output waveform, and the negative switching element is modulated between on and off over the negative half of the desired output waveform, with zero being produced by having both transistors off. This particular flawed approach is described in order to facilitate understanding of one of the desirable approaches.

This scheme has a fatal flaw as the following will illustrate. A positive output can only source current, and a negative output can only sink current. A phase at 'zero' volts is in fact off, and will not pass current at all. For proper motor operation, each phase must be able to both source and sink current at all voltages. As an additional issue, in the above scheme a single phase might be energized when the others are not. There is no circuit, and no potential difference applied across the phase winding.

In an embodiment of the present invention, the transistors are driven in a complementary fashion. Except for the required dead times, one of either the high side or low side transistors is always on. For any synthesized output voltage, the half bridge is capable of both sourcing and sinking current. Zero output voltage is synthesized with a 50% duty cycle.

Figure 4:
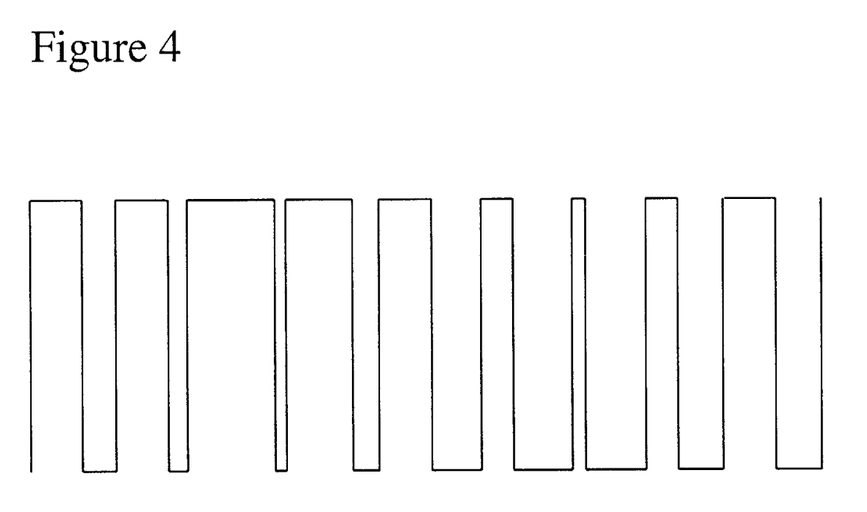
FIG. 4 depicts a standard drive waveform.

FIG. 4 shows the shape of the driving waveform used to drive each transistor according to the present invention.

For any modulation scheme, the currents produced by the modulation scheme must match those which would be produced by corresponding continuous voltages. Further, both inductive and resistive loads should be considered. The above modulation scheme, embodied in the present invention, moves the proper average current through a pure resistive load, both to neutral and to another phase, and the average potential difference applied to an inductive load is the same as the continuous voltage case.

One difficulty is found when the PWM carrier frequency is low. When using PWM techniques, the output of a half bridge is alternately connected either to the positive supply or the negative supply. The voltages of these supplies is high enough to produce the maximum voltage that the inverter may be called upon to produce, and is typically in the hundreds of volts. This means that when the inverter is synthesizing 0 volts, what is actually present at the inverter output is a 50% duty cycle square wave of several hundred volts in amplitude. The inductance of the winding acts to smooth the current flow through the phase, so that at sufficient PWM frequency this high amplitude square wave produces the same current flow as a low voltage continuous output, and is thus equivalent to the low voltage continuous output. However, at low PWM frequencies substantial current may flow at the PWM frequencies, causing extremely high instantaneous currents and reducing efficiency even though the average currents are correct.

In embodiments of the high phase order polyphase motor system, all PWM periods for all of the phases would start and end at the same time, with the modulation to achieve the desired output waveform changing the timing of transition between positive output and negative output state. When an output of zero volts was being synthesized, all of the phases would operate at 50% duty cycle, and all phases would transition from off to positive to off to negative to off at the same times. Although the voltage relative to ground of the phase outputs was a high amplitude square wave at the switching frequency, the voltage difference from phase to phase was zero, and no current would flow. When low frequency, low voltage output was synthesized, the duration of high amplitude voltage difference was very short, again preventing excessive high amplitude current flows.

Figure 5:
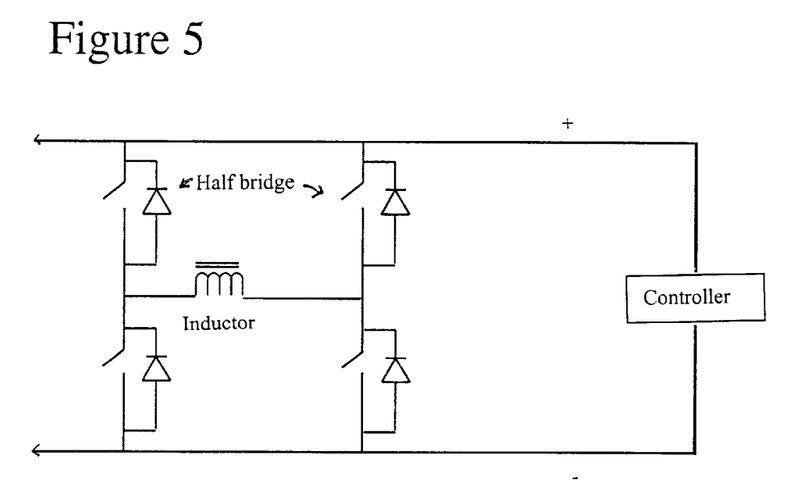
FIG. 5 depicts a full bridge driven inductor, which is used as a simplified example of how to evaluate qualities of a PWM waveform.
Figure 6:
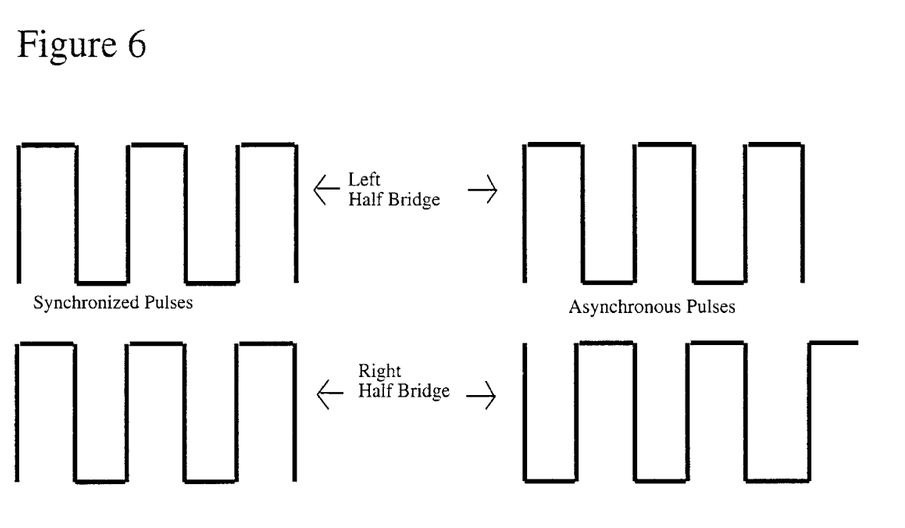
FIG. 6 represents the difference between synchronous and non-synchronous PWM on two different phases.

Thus, one may avoid high instantaneous currents in polyphase PWM systems by synchronizing the PWM periods. This may be better seen with reference to FIGS. 5 and 6. FIG. 5 is an exemplary two phase system consisting of two half bridges driving a single inductor. FIG. 6 is a graph of the various drive waveforms that may be applied to the circuit of FIG. 5. The upper pair of waveforms represent the drive waveforms that are applied to the left half bridge, while the lower pair of waveforms represent the drive waveforms that are applied to the right half bridge. The left pair of waveforms represent synchronized PWM periods, while the right pair of waveforms represent non-synchronized PWM periods. All four waveforms are 50% duty cycle, and thus are synthesizing a 0 volt output. Zero average current should flow through the inductor.

When the left pair of waveforms shown in FIG. 6 is applied to the circuit shown in FIG. 5, no current flows, no matter what the PWM frequency. When the right pair of waveforms shown in FIG. 6 is applied to the circuit shown in FIG. 5, currents will flow at the PWM frequency. The average current will be zero, and the instantaneous currents that do flow will be small if the PWM frequency is high enough.

In the case of the synchronous set of drive waveforms, not only is the average potential across the inductor zero, but the instantaneous potential is zero. In the case of the asynchronous set of drive waveforms, there are rather large instantaneous potentials. This is not a problem if the inductance is high enough, but will cause issues at low switching frequencies.

In the present invention, in order to make the PWM carrier a harmonic of the desired output waveform, a fixed number of pulses per output cycle are used. This reduces the size of the lookup table needed to define the output waveform to the number of pulses in a single cycle. Additionally, to insure that this PWM harmonic produces an oscillating field that is synchronous with the fundamental, the number of pulses per output cycle must be less than the number of phases being synthesized for the motor. These conditions force the various phases to operate with non synchronized PWM cycles. If this full duration PWM is used, then this will lead to large instantaneous current flows, and high current flow at the PWM frequency, as described above.

Figure 7:
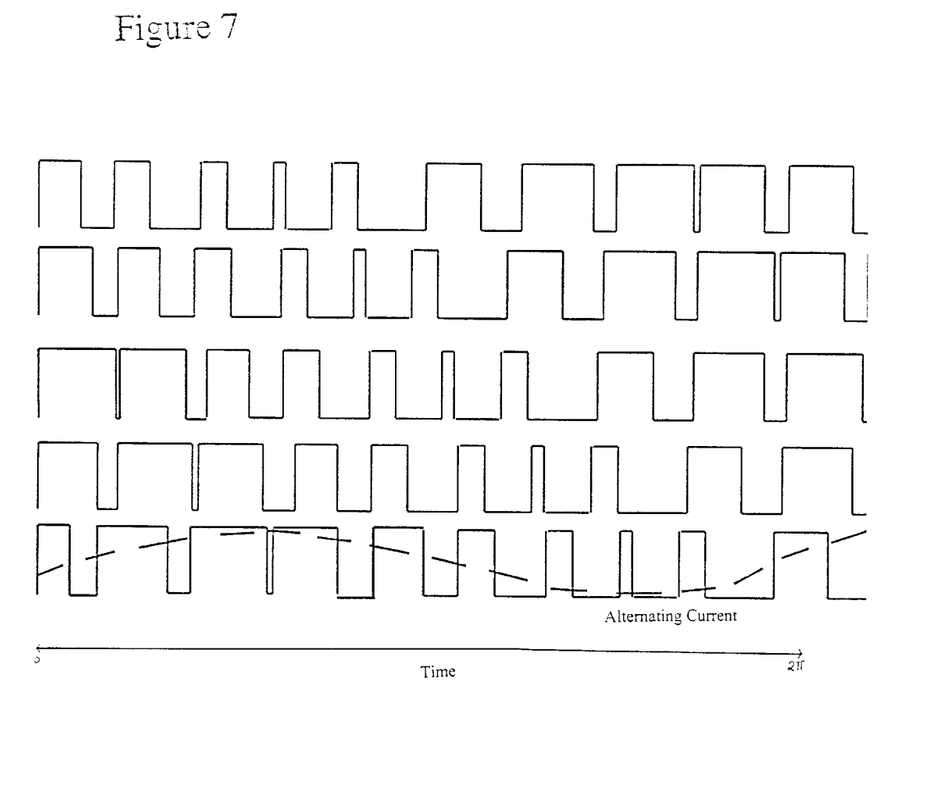
FIG. 7 depicts five phases of a 9 pulse per cycle 40° phase angle system according to the present invention.

To provide the synchronization properties used above, the number of pulses per cycle is matched to the phase angle difference needed to drive the individual phases. In an 18 phase machine, the minimum phase angle difference is 10°. To provide synchronization both to the AC waveform and pulses, 36 or a multiple of 36 pulses per cycle are used. FIG. 7 depicts 5phases of a 9 pulse per cycle 40° phase angle system (values chosen to for drawing simplicity). Noting, a 40° phase angle system is a 9 phase system. In this case, modulation is near 100%.

In the present invention, a switching period and phase relation are selected that cause the PWM pulsing waveform to act as a synchronous harmonic with the motion of the rotor. Since the speed of the rotor is usually quite close to synchronous speed, and since the pole count of the oscillating fields that may be produced by the stator is limited by the number of independent phases, the selected switching period will be very long at low rotor speeds.

As is well known, when an induction motor is slowed down, it must be operated at lower voltage in order to prevent saturation of the magnetic circuits and excessive current flow. Using voltage mode PWM techniques, zero voltage is synthesized by having the positive switching element on for the same amount of time as the negative switching element, and low voltages are synthesized by varying the on times only slightly from equal duration. In the present invention, at low synchronous speeds, with full duration PWM, individual switching elements would be on for extended periods of time. This will cause magnetic saturation and excessive current flow, as the switching frequency will be too low to be filtered by the natural inductance of the motor windings.

The solution utilized in the present invention is to decrease the switching element on times essentially by the increase of switching 'dead time'. Over most of the duration of the PWM period, both the positive and negative switching elements are off. The positive element is then turned on for a suitable period of time, then turned off, and the negative element is turned on for a suitable period of time, and turned off, followed by a the extended dead time.

To select the total 'on' duration, or combined positive and negative 'on' duration, for a given output voltage and frequency, one determines the maximum differential between positive switching element on and negative switching element on. This maximum differential is used as the total 'on' duration, such that at the peaks of the synthesized waveform only one of the switching elements will be on during that PWM period. In this way maximum 'on' times are reduced to acceptable values.

When selecting pole count to be developed by the PWM switching frequency and phase relation, pole counts must be selected to enable balanced sets of phases to conduct at the same time. If this is not done, then there will be no closed current path through the motor and the inverter system. This conduction relation will be maintained as long as both the number of phases and the number of PWM pulses per fundamental cycle both have a low common factor, such as three. For example, if 15 pulses per cycle are used in an 18 phase drive system, then phases will always be driven in three phase balanced sets, and a synchronous oscillating field of 15 times the pole fundamental pole count will be produced.

The benefit of the polyphase motor is that harmonics in the drive waveform, up to the number of phases, will be brought into synchrony with the fundamental drive waveform. In another embodiment of the invention, low switching frequencies are used, rather than having to use extremely high switching frequencies for efficiency. The basic switching pattern is the same as the above, except that a pulse count lower is lower than the phase count. This introduces a timing complexity; the pulses no longer start at the same time. Nevertheless, this could be used to advantage, with proper selection of pulse rate, all pulses will start at different times in an orderly sequence.

Another approach is to select a pulse rate that causes some phase output pulses to start at the same time, and to calculate these pulses, and then to use shift register delays to generate the other phase outputs. For example, by choosing 15 pulses per AC cycle, phases 120° apart will have pulses that start at the same time. Three phases could be calculated, and then the rest of the phases generated using delay line techniques.

A difficulty with this approach is that at low frequencies, the PWM frequency will get very low, and will reach the point where the inductance of the motor winding is not enough to maintain continuous smooth current flow. This is especially the case given the fact that the inductance that a particular winding sees is related to the number of phases and the phase angle between them. Consider a 15 pulse per cycle output, synthesizing zero volts, meaning a 50% duty cycle. The pulses are timed so as to be in synchrony with the fundamental. This means that some pulses will be going positive as others are going negative, and the timing will be such as to generate an oscillating field. The net result will be that synthesis of a '0 volt' two pole field, will actually generate a 30 pole field at the full rail voltage. This will be horribly inefficient, and will likely overload either the motor or the controller. As mentioned above, this problem can be eliminated by decreasing switching element on time through increased deadtime.

In order to implement PWM that is synchronous with the fundamental, and avoid the problems of applying full rail voltage at low frequencies, we need to reduce the total on time of the transistors. It is still necessary to use a 'bipolar' drive pattern, in order to allow the controller to both source and sink current at any voltage. However, it will increase the 'dead time' substantially. An appropriate PWM waveform is described as follows.

The peak point of the fundamental synthesized waveform determines the maximum required difference between positive and negative pulse duration. The total combined on time of both positive and negative pulses is set to be this value. The PWM switching period is maintained constant by increasing a dead time between pulse periods. At low synthesized voltages, the switching elements are predominantly off.

Another approach that makes use of the harmonic tolerance of the motor is to drive the motor with square wave pulses. For each cycle of the output frequency, each positive transistor would be turned on for a single pulse, and each negative transistor would be turned on for a single pulse. Voltage would be controlled by adjusting pulse duration, and frequency would be adjusted by adjusting pulse period.

Yet another technique may be used to produce a fundamental synchronized PWM oscillating field while preventing excessive current flow at the PWM frequency. In this case, full duration PWM techniques are used, with no deadtime adjustment. The number of system phases and the number of pulses per cycle are selected so as to both be multiples of the same small integer, e.g., three. Given this condition, balanced subsets of the motor phases will have synchronized PWM periods. As mentioned above, when the number of pulses per cycle is different from the number of phases, the PWM periods may not be synchronized, and high potential differences will be applied to the phases at the PWM frequency. However subsets of the PWM outputs are synchronized. By electrically connecting only those phases driven by synchronized PWM outputs, full duration PWM may be used with the number of pulses per fundamental cycle being less than the number of phases, and without excessive PWM frequency current flow. As a specific example, an 18 phase machine may be driven with 15 pulses per fundamental cycle. The 18 phases in the motor are divided into 6 independent, balanced three phase sets. Each set is connected to one of six independent star points and to the appropriate inverter output stages.

When small subsets of the total winding are independently connected, then these may be connected using techniques other than star connection. For example individual 3 phase sets may be delta connected, and higher phase counts may be connected using alternative mesh topologies. If the common factor between the number of pulses per AC cycle and the number of phases is 2, then windings 180 electrical degrees apart will have pulse synchronization. These two windings may be considered as two halves of a single winding being driven using full bridge drive.

As used in this specification, the term "oscillating field" includes the rotating field of a rotating machine as used in the art, as well as the pulse train of a linear induction machine. Similarly, the term "rotor" includes the rotating member of a rotating induction machine as used in the art, as well as the moving member of a linear induction machine.

While this invention has been described with reference to illustrative embodiments, it is to be understood that this description is not intended to be construed in a limiting sense. Modifications to and combinations of the illustrative embodiments will be apparent to persons skilled in the art upon reference to this description. It is to be further understood, therefore, that changes in the details of the embodiments of the present invention and additional embodiments of the present invention will be apparent to persons of ordinary skill in the art having reference to this description. It is contemplated that such changes and additional embodiments are within the spirit and true scope of the invention as claimed below.

We claim:

1. An electrical induction machine comprising:
    a n phase order induction motor in which n is greater than three;
    a controller for synthesizing an alternating current having n phases, said alternating current inducing a first rotating magnetic field in windings of said motor, wherein said current is derived using pulse width modulation having a fixed number of pulses per cycle, said fixed number being less than n;
    wherein the timing and duration of said pulses is selected so that distortion in said current produces a second rotating magnetic field in said motor that is synchronous with said first rotating magnetic field.

2. An electrical induction machine as in claim 1, wherein said pulse-width modulation technique comprises a fixed number of pulses per AC, cycle matched to a phase angle difference needed to drive individual phases.

3. An electrical induction machine as in claim 2, wherein said number of pulses per AC cycle is less than said number of phases.

4. An electrical induction machine as in claim 2, wherein said number of pulses per AC cycle is less than said number of phases and both said number of pulses and said number of phases are multiples of an integer.

5. An electrical induction machine as in claim 4, wherein said integer is equal to three.

6. An electrical induction machine as in claim 5, wherein said windings in said motor are connected in balanced groups each containing a number of phases equal to said integer.

7. An electrical induction machine as in claim 1, wherein said pulse-width modulation technique comprises square wave pulses, wherein a voltage of said synthesized alternating current is controlled by adjusting a pulse duration and a frequency of said synthesized alternating current is controlled by adjusting a pulse period.

8. An electrical induction machine as in claim 1, wherein a pulse-width modulation switching period is maintained constant by increasing a dead time between pulse periods, wherein a peak point of said synthesized waveform determines a maximum required difference between a positive and negative pulse duration, and wherein a total combined on time of both said positive and negative pulses is set to said maximum difference.

9. An electrical induction machine as in claim 1, wherein said controller comprises a full bridge drive, and wherein small subsets of a total winding of said n phase order induction motor are independently connected.

10. A drive system comprising:
   electronics for synthesizing an alternating current having n phases to operate a n phase order induction machine in which n is greater than three, wherein said current is derived using pulse width modulation having a fixed number of pulses per cycle, said fixed number being less than n;
   wherein the timing and duration of said pulses is selected so that distortion in said current produces a rotating magnetic field in said motor that is synchronous with the primary rotating magnetic field developed in said motor;
   a logic level controller to provide pulse-width modulation signals to said electronics.

11. A drive system as in claim 10, wherein said pulse-width modulation technique comprises a fixed number of pulses per AC cycle matched to a phase angle difference needed to drive individual phases.

12. A drive system as in claim 11, wherein said number of pulses per AC cycle is less than said number of phases.

13. A drive system as in claim 11, wherein said number of pulses per AC cycle is less than said number of phases and both said number of pulses and said number of phases are multiples of an integer.

14. A drive system as in claim 13, wherein said integer is equal to three.

15. A drive system as in claim 14, wherein said windings in said motor are connected in balanced groups each containing a number of phases equal to said integer.

16. A drive system as in claim 10, wherein said pulse-width modulation technique comprises square wave pulses, wherein a voltage of said synthesized alternating current is controlled by adjusting a pulse duration and a frequency of said synthesized alternating current is controlled by adjusting a pulse period.

17. A drive system as in claim 10, wherein a pulse-width modulation switching period is maintained constant by increasing a dead time between pulse periods, wherein a peak point of said synthesized waveform determines a maximum required difference between a positive and negative pulse duration, and wherein a total combined on time of both said positive and negative pulses is set to said maximum difference.

18. A drive system as in claim 10, further comprising a full bridge drive, and wherein small subsets of a total winding of a n phase order induction motor are independently connected.

19. A method for producing a synchronized drive waveform for a n phase order induction machine in which n is greater than three, comprising the steps of:
   supplying electrical power from a DC power supply to n half-bridge circuits, wherein each of said half-bridge circuits comprises a positive switching element connected to a positive rail of said DC power supply and a negative switching element connect to a negative rail of said DC power supply;
   operating said switching elements according to an input control logic signal, wherein said control logic signal is a periodic waveform generated by a pulse-width modulation technique;
   outputting a drive waveform at each half-bridge to drive each phase, wherein said drive waveform is displaced in time by a phase angle that is equal to a physical angle of a winding in a stator;
   synthesizing an alternating current having n phases, wherein said current is derived using pulse width modulation having a fixed number of pulses per cycle, said fixed number being less than n;
   wherein the timing and duration of said pulses is selected so that distortion in said current produces a rotating magnetic field in said motor that is synchronous with the primary rotating magnetic field developed in said motor.

20. The method of claim 19, wherein said pulse-width modulation technique comprises a fixed number of pulses per AC cycle matched to a phase angle difference needed to drive individual phases.

21. The method of claim 20, wherein said number of pulses per AC cycle is less than said number of phases.

22. The method of claim 20, wherein said number of pulses per AC cycle is less than said number of phases and both said number of pulses and said number of phases are multiples of an integer.

23. The method of claim 22, wherein said integer is equal to three.

24. The method of claim 23, wherein said windings in said motor are connected in balanced groups each containing a number of phases equal to said integer.

25. The method of claim 19, wherein said pulse-width modulation technique comprises square wave pulses, wherein a voltage of said synthesized alternating current is controlled by adjusting a pulse duration and a frequency of said synthesized alternating current is controlled by adjusting a pulse period.

26. The method of claim 19, wherein a pulse-width modulation switching period is maintained constant by increasing a dead time between pulse periods, wherein a peak point of said synthesized waveform determines a maximum required difference between a positive and negative pulse duration, and wherein a total combined on time of both said positive and negative pulses is set to said maximum difference.

27. The method of claim 19, wherein small subsets of a total winding of said n phase order induction machine are independently connected to full bridge drives.

* * * * *